June 7, 1960 R. J. PRIESTLEY 2,939,411
DRYING APPARATUS AND PROCESS
Filed Feb. 1, 1957 2 Sheets-Sheet 1

INVENTOR
Robert J. Priestley
BY William J. Fox
ATTORNEY

United States Patent Office 2,939,411
Patented June 7, 1960

2,939,411

DRYING APPARATUS AND PROCESS

Robert J. Priestley, Westport, Conn., assignor to Dorr-Oliver Incorporated, Stamford, Conn., a corporation of Delaware Filed Feb. 1, 1957, Ser. No. 637,716

2 Claims. (Cl. 110—28)

This invention relates to apparatus and process for drying finely-divided solid combustible materials, such as coal or fine pyrites, and is particularly directed to apparatus and process for controlling the temperature of the drying gases.

Furnaces for burning fine coal and other materials, such as cyclone furnaces, are well known, but in these applications there is a problem to obtain the fineness of material needed to be successfully burned in the furnace. There is therefore normally associated with such furnaces a mechanical pulverizer of some type, such that it will grind the materials to a fine size and supply these fine materials to the burner. This invention contemplates elimination of all mechanical pulverizing aspects of fine coal burning and proposes a control such that only the coal which is small enough to burn successfully and satisfactorily will be fed to the burner and it will be fed at the same time with the gases necessary to support combustion of that fine coal in the burner.

It is therefore an object of this invention to develop a fine solids-burning process and apparatus in which no mechanical pulverizing equipment is used.

It is a further object of this invention to develop a coal burner feed in the form of a fluidized bed system and its discharge gases.

It is a further object of this invention to develop an integrated coal-drying system in which part of the coal to be dried also acts as the fuel supply to effect the drying under automatic control conditions. These and other objects will be developed as this specification proceeds.

In summary, the foregoing are obtained by providing a small totally-enclosed chamber in which a fluidized bed is maintained, into which bed fine coal solids of varying sizes are fed. Air is injected into the lower portion of the chamber to fluidize these fine solids and the air rate is controlled to be such that it will fluidize the solids in the bed and at the same time entrain the fine solids of the bed. The amount of fine solids that are entrained may be controlled by the gas velocity passing upwardly through the bed. These fine solids, together with their entraining air, are then fed directly, without passing through a cyclone or other separating device, into a coal burner where they are combusted. The simultaneous supply of air and fine solids to the coal burner is controlled by controlling the fluidizing air entering the bottom of the small fluidizing chamber.

The foregoing may also form a portion of an integrated coal-drying system in which the coal dryer comprises a fluidized drying bed contained in a chamber into which fine moisture-bearing coal solids are supplied for drying and from which dried relatively fine coal solids are removed with the gas, to be later separated therefrom in a cyclone separator. These separated fine solids are utilized as the feed to the abovementioned small fluidized bed and the amount of such solids fed to the small bed is also controlled. There is thus effected a dual control over the small fluidized bed in that the fine solids being entrained therefrom for supply to the burner may be controlled by the fluidizing air supplied to the small bed. When this air supply reaches a predetermined maximum such that it is beginning to entrain some of the less desirable coarser materials of the feed, then the fine solids feed to the bed from the fluidized drying bed may also be controlled, in this case increased, so as to supply to the small bed more of the desirable finer solids. The co-ordination of these two controls will yield a quantity of gas and an amount of fine solids for combustion which fall within any desired range.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly co-operative equivalents, are therefore intended to be embraced by those claims.

For a more complete understanding of this invention, reference is now made to the drawings, in which—

Figure 3 is an idealized showing of the system for air supply to the fluidized classifier and is a completion of Figure 2.

Figure 1:
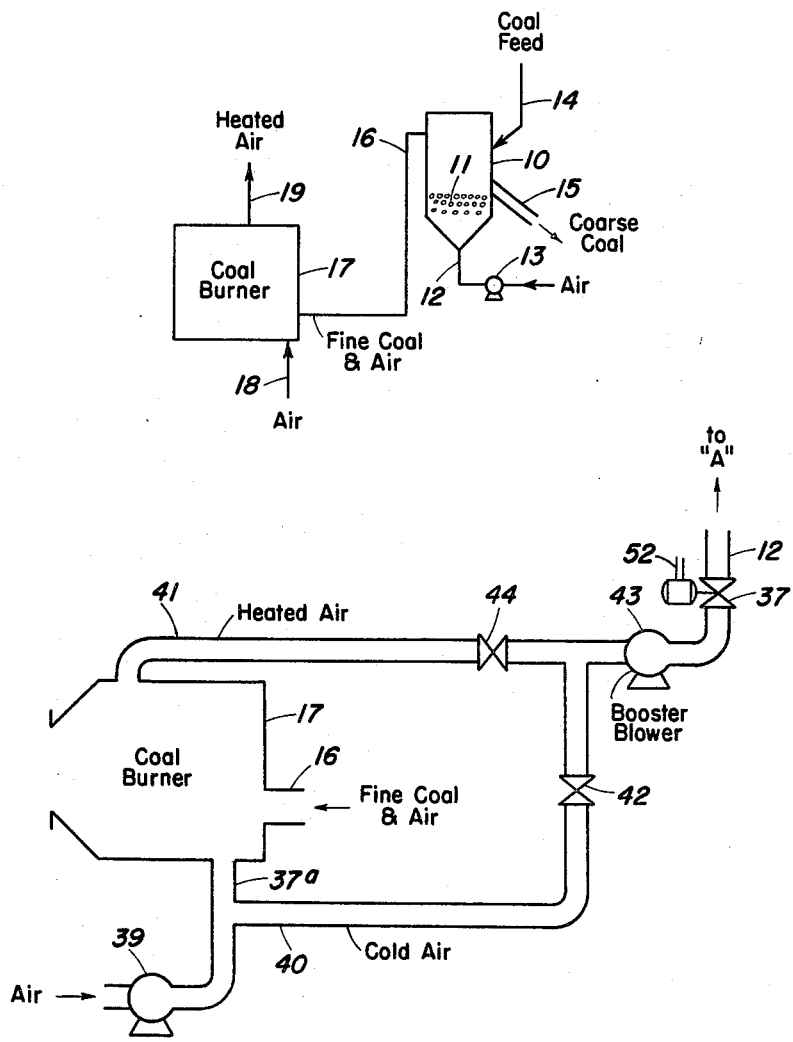
Figure 1 is an idealized showing of the controlled air and coal feed to the burner.

More particularly in the drawings, in Figure 1, the enclosed fluidized chamber 10 has contained therein a bed of fine solids 11 maintained in a fluidized condition by air supplied thereto through duct 12 from blower 13. The feed to chamber 10 enters through feed duct 14.

In chamber 10 the air supply is so controlled that fine solids will be entrained with the air. Remaining in the bed will be the non-entrained coarser solids, which are discharged via overflow duct 15, which controls the upper level of bed 11. The fluidizing gas with its entrained solids passes from the reactor through duct 16 and thence directly into coal burner 17 without any separation of its entrained solids. In the coal burner 17 there is effected a burning of the coal supported by the carrying air stream. To furnish the necessary remaining combustion medium air duct 18 feeds into the coal burner 17 which includes a combustion chamber and is in turn supplied by a blower. Heated air discharges from the burner through duct 19.

Figure 2:
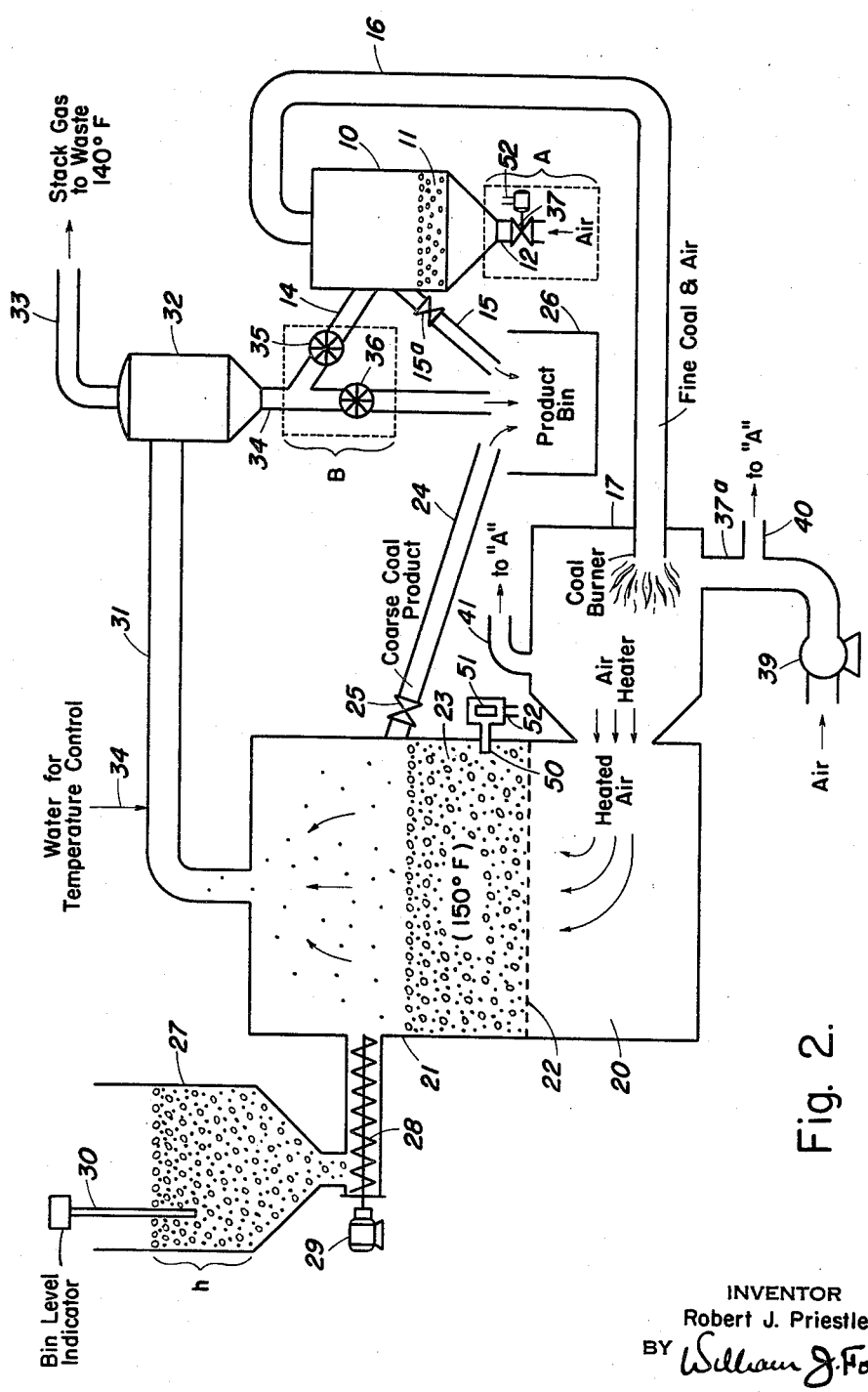
Figure 2 is an idealized showing of an integrated system for coal drying and coal burning to produce the gases for drying.

In Figure 2 an integrated system for the drying of coal and for generating the heated gases for drying is shown. The same parts have the same numbers in the drawings.

In Figure 2 the coal burner and combustion chamber 17 is directly associated with the wind box 20 of another fluidized chamber 21. The wind box is separated from the upper portion of the chamber by means of a slotted or otherwise gas-permeable constriction plate 22 through which the fluidizing gases pass. Contained on the upper surface of that constriction plate 22 is a fluidized bed 23 of coal solids undergoing drying. The dry coal is discharged through duct 24 controlled by valve 25 into product bin 26. The coal to be dried is supplied to supply bin 27, thence to chamber 21 through screw feeder 28 with its motor 29. Supply bin 27 is maintained with a supply of coal at least of height $h$ in order to provide a seal against the pressurized gases existing in chamber 21. A bin level indicator 30 will shut off the feed to the system or, alternatively, sound an alarm if the height falls below this level.

The bed in chamber 21 is maintained at a drying temperature of approximately 150° F. by controlling the temperature of the heated air supply, as hereinafter described. Fine solids, together with the drying gas and the moisture vapor, pass upwardly from the chamber through duct 31 into cyclone separator 32, the fine solids are separated from the gas and the clean gas leaves the separator through duct 33.

It has been found that if the temperature of the cyclone separator is maintained at a temperature close to the dew point of the vaporizable liquid in the gas, a remarkable increase in solids collection results. To accomplish this increase in collection there is provided water spray pipe 34a injecting liquid water into the duct 31 to further lower the temperature of the gases in that duct in the event they are not near the dew point of the vapor. In practice it has been found that the gases entering the cyclone separator 32 should be controlled so that the relative humidity is between approximately 85–95% if the vaporizable liquid is water, in order to obtain the benefit of this unexpected increased collection. This may be accomplished also by controlling the total quantity of air to the dryer. In a startling demonstration with coal, it has been observed that when the stack is emitting a black coal-laden gas, the increase in relative humidity, as indicated, will cause the stack to change to a white gas emission very rapidly. This can be seen also where an increase in temperature of 10° (which reduces the relative humidity) causes the stack gas to suddenly blacken. A desirable operating range has been found to be 125°–145° F.

Fine solids being discharged from separator 32 pass through duct 34 having a branch duct 14. Each of these ducts has associated therewith a control valve, 35 and 36 respectively, for controlling the amount of fine solids passing into each duct. Control valve 35 must be capable of withstanding and sealing the pressure existing in chamber 10. This branch duct arrangement, with its control valves, is designated as a secondary control for the coal burner.

A portion of this fine coal is fed to chamber 10, as described in connection with Figure 1. The primary control of the coal burner is effected by means of control valve 37, which is designated as primary control A of Figure 2. If a higher temperature is desired in the coal burner and subsequently in the fluidized dry bed 23, then control valve 37 is opened to introduce more air into chamber 10 and thereby to entrain more of the fine solids and pass them with the air to the coal burner. When it has been found that the solids being fed to the coal burner are becoming too coarse, then valve 35 may be controlled so as to feed to chamber 10 a greater portion of the solids passing from the cyclone separator. When this is done control valve 37 may be closed down and the coarseness of the material being fed to the coal burner will thereby be reduced. It may thus be seen that a very effective inexpensive burner control is accomplished by the correlation of primary control A and secondary control B. The coarse solids remaining in the bed of chamber 10 may be discharged through duct 15 into product bin 26. Duct 15 must be sealed with some means such as valve 15a to prevent the loss of pressure from chamber 10.

The supplementary air for burning is supplied to coal burner 17 through duct 37a from blower 39. From duct 38 there leads an auxiliary cold air duct 40 and from the coal burner there leads an auxiliary heated air duct 41, as will be described with more particularity in connection with Figure 3.

Figure 3 represents a further refinement in the manner of controlling the air supplied to fluidized chamber 10. Cold air through pipe 40 and valve 41 is supplied to booster blower 43 and thence through valve 37 and duct 12 into fluidizing chamber 10. Heated air through duct 41 and valve 44 is also supplied to booster blower 43 by controlling the settings of valves 42 and 44, to control the temperature of the air entering chamber 10. It is sometimes necessary to provide heated air to chamber 10 because the moisture content of the coal supplied to chamber 10 may be so high as to interfere with effective classification of the solids therein.

The entire system may be arranged to operate automatically by providing temperature-sensing means in fluidized bed 23, which means serve to close down the setting on valve 37 when the temperature in the bed 23 exceeds an upper determined limit. Such a temperature-sensing means is shown in Figure 2 as thermocouple 50 connected to thermostat 51, which in turn through wire 52 controls valve 37 by means not shown, but well known in the art. In order not to unduly increase the moisture content of the coal burning system and also to prevent coal oxidation, it is desirable to operate drying bed 23 at about 150° F. Operating close to the dew point in the collector 32 is also useful from a safety point of view as the fine solids being collected have sufficient moisture in them to reduce their tendency toward flash burning. The arrangement as shown herein is also conducive to safety in the fluidized bed 23, as the air blower 39 and its associated air duct 37a are so arranged as to furnish a constant air supply without manual control to the coal burner and subsequently to the fluidized bed. If the bed should rise to a dangerously high temperature, it would shut down air valve 37 and hence reduce or eliminate the coal feed to the coal burner, the cold air going through duct 37a would sweep immediately through the coal burner and into the fluidized bed and serve to cool the fluidized bed down to a safe operating temperature.

In a typical operating installation for drying coal the drying reactor is 7 feet in diameter and would have a feed rate of 90 tons per day of fine coal which ranges in size from ¼ inch down to fine powder and which has about 12% moisture. The coarse coal product discharged from the drying bed to the product bin would contain a fraction between ¼ inch and 28 mesh (Tyler) and would be dried to about 3% moisture. The material being entrained and carried overhead would enter the cyclones at about 4% moisture and would have a particle size of from about 28 mesh down to fine powder. This product, when collected in the cyclones, would be fed to the classifying bed in an amount equal to about 50% of that discharging from the cyclones. The bed of coarse product discharge from the small classifying reactor would contain that material which was coarser than about 150 mesh, while the material that was removed from this bed and fed to the coal burner for burning would contain the material that was finer than 150 mesh. The fluidizing air velocity in the classifying bed, in order to carry overhead material finer than 150 mesh, would be regulated at about one foot per second. In normal operation the size of these particles will vary between about 100 to about 200 mesh and the air rate would have to be modified accordingly to be between about 1½ feet per second to about ½ foot per second. If the moisture content in the classifying bed rose to about 5–6% water or higher, the classification efficiency would be seriously hampered and it would be necessary under those conditions to add the heated air from the coal burner (shown as pipe 41 in Figure 2).

In addition to drying coal according to the foregoing arrangement, this invention is also useful for drying any solid combustible material in which the fines can economically be burned to furnish the heat for drying. Typical of these materials would be pyrites, peat, lignite, sawdust and wood chips.

I claim:

1. A system for drying solid combustible materials comprising a first fluidizing chamber for containing a bed of finely-divided solid combustible materials maintained in a pseudo-liquid fluidized condition by passing therethrough a heated drying gas for simultaneously fluidizing, drying and classifying the solid materials into a fine fraction and a coarse fraction, means for supplying wet finely-divided materials to the chamber, duct means for discharging a dry coarse product from the chamber, a discharge duct for the gases and the fine fraction of the solid materials attached to the upper portion of the chamber, cyclone means attached to the discharge duct for removing the fine solids fraction from the gas, a duct connected to the lower portion of the cyclone means for conducting the fine solids fraction from the cyclone, said duct having a plurality of branch ducts, a first control means for regulating the quantity of the fine fraction solids which is supplied to each of the branch ducts, a second fluidizing chamber connected to at least one branch duct, said second chamber adapted to contain a bed of finely-divided solid combustible materials maintained in a pseudo-liquid fluidized condition by passing therethrough a fluidizing gas capable of supporting combustion, a second control means for regulating the quantity of fluidizing gas passing through said second chamber to effect a classification in the fluidized bed to permit material of larger particle size to remain in the bed, while entraining material of smaller particles sizes in said second gas stream, a duct attached to the chamber for discharging product solids from the chamber, a combustion chamber arranged and effective to supply said heated gas to said bed in the first chamber, a first gas conveying duct communicating at one end with said second fluidizing chamber and at its other end with said combustion chamber thereby enabling transfer of gas and entrained solids from said second fluidizing chamber into said combustion chamber, means associated with said combustion chamber enabling burning of said entrained particles to yield heated gas, said means including a first valved cool-gas conveying duct enabling controlled introduction of cool combustion-supporting gas into said combustion chamber, a heated-gas conveying duct communicating at one end with said combustion chamber and at the other end with said second fluidizing chamber enabling the supply of hot gases to said second chamber through said second control means for regulating the quantity of fluidizing gas passing through said second chamber, means enabling control of treatment conditions in both of said fluidizing chambers, said means comprising a second cool-gas conveying duct communicating with said hot-gas conveying duct at a juncture, mixture control means for regulating the proportions of heated gas and cool gas passing to said second fluidizing chamber, and booster blower means located between said juncture and said second control means for forcing gas through said second fluidizing chamber.

2. Apparatus according to claim 1 with the addition of means adapted to sense the temperature in said first chamber and actuating means associated with the controllable valve means on said second hot-gas conveying duct and responsive to said temperature sensing means to open and close said controllable valve.

References Cited in the file of this patent
UNITED STATES PATENTS

| | | |
|---|---|---|
| 2,586,818 | Harms | Feb. 26, 1952 |
| 2,638,684 | Jukkola | May 19, 1953 |
| 2,776,725 | Wood | Jan. 8, 1957 |